United States Patent
Kim

(10) Patent No.: US 8,546,005 B2
(45) Date of Patent: Oct. 1, 2013

(54) CAP ASSEMBLY AND SECONDARY BATTERY HAVING THE SAME

(75) Inventor: Dae-Kyu Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 366 days.

(21) Appl. No.: 12/591,919

(22) Filed: Dec. 4, 2009

(65) Prior Publication Data

US 2010/0159310 A1 Jun. 24, 2010

(30) Foreign Application Priority Data

Dec. 23, 2008 (KR) ........................ 10-2008-0132242

(51) Int. Cl.
*H01M 2/04* (2006.01)
*H01M 2/08* (2006.01)
*H01M 2/12* (2006.01)

(52) U.S. Cl.
USPC ............................. 429/53; 429/56; 429/175

(58) Field of Classification Search
USPC ........................ 429/53–56, 72, 175
See application file for complete search history.

(56) References Cited

U.S. PATENT DOCUMENTS

| 4,943,497 A | 7/1990 | Oishi et al. |
| 2005/0214641 A1 | 9/2005 | Kim |
| 2006/0216588 A1* | 9/2006 | Kim et al. ..................... 429/174 |
| 2007/0009785 A1* | 1/2007 | Kozuki et al. .................. 429/53 |
| 2007/0212595 A1 | 9/2007 | Kim et al. |

FOREIGN PATENT DOCUMENTS

| JP | 02-112151 A | 4/1990 |
| JP | 2002-245987 A | 8/2002 |
| JP | 2003-178746 A | 6/2003 |
| JP | 2003187773 A * | 7/2003 |
| JP | 2005-108503 A | 4/2005 |
| JP | 2005-259410 A | 9/2005 |
| KR | 10 1998-0022936 A | 7/1998 |
| KR | 10 2007-0093171 A | 9/2007 |
| KR | 10 2008-0050642 A | 6/2008 |

* cited by examiner

*Primary Examiner* — Gregg Cantelmo
(74) *Attorney, Agent, or Firm* — Lee & Morse, P.C.

(57) ABSTRACT

A cap assembly includes a cap-up and a safety vent wherein an end of the safety vent is bent to cover an end of the cap-up, a first thickness of a first region of the cap-up in contact with the end of the safety vent is smaller than a second thickness of a second region of the cap-up not in contact with the end of the safety vent.

16 Claims, 4 Drawing Sheets

CAP ASSEMBLY AND SECONDARY BATTERY HAVING THE SAME

BACKGROUND

1. Field

Embodiments relate to a cap assembly and a secondary battery having the same and, more particularly, to a cap assembly having a stable connection between a safety vent and a cap-up thereof, without increasing a thickness of an end of the cap assembly, and a secondary battery having the same.

2. Description of the Related Art

In recent times, compact, slim, and light-weight portable electric/electronic devices, e.g., cellular phones, notebook computers, and camcorders, are actively developed and produced. These devices include a battery pack that is used in places where a power source is not provided. Examples of the battery pack include nickel-cadmium (Ni—Cd), nickel-metal hydride (Ni-MH) and lithium (Li) batteries. In consideration of economic feasibility, the battery pack may generally be a secondary battery, which can be recharged.

The lithium secondary battery is widely used for the portable electric/electronic devices because of the advantages that the lithium second battery has over both the nickel-cadmium battery and the nickel-metal hydride battery. For example, the lithium secondary battery has an operational voltage about three times larger than that of the nickel-cadmium battery or the nickel-metal hydride battery. Also, the lithium secondary battery has a higher energy density per unit weight than the nickel-cadmium and the nickel-metal hydride batteries. The lithium secondary battery may be classified based on the kind of electrolyte, e.g., a lithium ion battery using a liquid electrolyte or a lithium polymer battery using a polymer electrolyte. The lithium secondary battery may be also classified based on the shape thereof, e.g., cylindrical, prismatic or pouch type.

The secondary battery generally includes an electrode assembly, a can housing the electrode assembly and an electrolyte allowing migration of lithium ions in the electrode assembly, and a cap assembly sealing the can. The electrode assembly includes a positive electrode plate having a positive electrode collector to which a positive electrode active material is applied and a positive electrode tab electrically connected to a side of the positive electrode assembly. The electrode assembly further includes a negative electrode plate having a negative electrode collector to which a negative electrode active material is applied and a negative electrode tab electrically connected to a side of the negative electrode collector. A separator is included in the electrode assembly to interpose between the two electrode plates.

The cap assembly of a cylindrical secondary battery is a bit different from other types, i.e., prismatic or pouch type of the lithium secondary battery. The cap assembly of a cylindrical secondary battery generally includes a cap-up and a safety vent. The cap-up may be electrically connected to an external terminal and to a top opening of the can to seal the can, and a safety vent may be electrically connected to the positive or negative electrode plate and may deform or break in order to discharge gas outside when an inner pressure of a cylindrical secondary battery is higher than a predetermined level due to gas generated from the electrode assembly. The cap assembly may further include a current interrupt device (CID) disposed on the safety vent. The CID may be deformed or broken by the safety vent to interrupt an electrical connection between the electrode assembly and an external terminal when the safety vent is deformed or broken due to the internal gas. The cap assembly may further include a positive temperature coefficient (PTC) thermistor disposed between the CID and the cap-up, or between the safety vent and the CID to prevent overcurrent between the electrode assembly and the external terminal.

SUMMARY

Embodiments are directed to a cap assembly and a secondary battery having the same.

It is therefore a feature of an embodiment to provide a cap assembly for connecting a safety vent to a cap-up without increasing a thickness of an end of the cap assembly, and a secondary battery having the same.

It is therefore another feature of an embodiment to provide a cap assembly for adhering a bent portion of the safety vent to an end of the cap-up and to an end of a PTC thermistor or CID disposed between the safety vent and the cap-up, and a secondary battery having the same.

At least one of the above and other features and advantages may be realized by providing a cap assembly including a cap-up and a safety vent wherein an end of the safety vent may be bent to cover an end of the cap-up, a first thickness of a first region of the cap-up in contact with the end of the safety vent being less than a second thickness of a second region of the cap-up not in contact with the end of the safety vent.

The second thickness may be the same as the sum of the first thickness and a thickness of the safety vent.

The cap assembly may include a current interrupt device disposed between the cap-up and the safety vent.

A cross-section of ends of the cap-up and the current interrupt device may be formed in a semi-circular or a chamfered shape.

A cap assembly may further include a cap-down having a hole through which a certain region of the safety vent passes in the middle, a sub-plate electrically connected to the cap-down and in direct contact with the certain region of the safety vent, and an insulating plate insulating the cap-down and the sub-plate from the safety vent.

A cap assembly may further include a positive temperature coefficient PTC thermistor interposed between the cap-up and the safety vent.

The shape of the cross-section of ends of the cap-up and the PTC thermistor may be semi-circular or a chamfered shape. A welding point may be located in the first region of the cap-up.

At least one of the above and other features and advantages may also be realized by providing a secondary battery including an electrode assembly having a positive electrode plate, a negative electrode plate, and a separator disposed between both electrode plates, a can housing the electrode assembly, and a cap assembly sealing the can and including a safety vent and a cap-up having an end covered by an end of the safety vent, wherein a first thickness of a first region of the cap-up in contact with the end of the safety vent may be less than a second thickness of a second region of the cap-up not in contact with the end of the safety vent.

The second thickness may be the same as the sum of the first thickness and a thickness of the safety vent.

A secondary battery may include a current interrupt device disposed between the cap-up and the safety vent.

A shape of the cross-section of ends of the cap-up and the current interrupt device may be semi-circular or chamfered shape.

A secondary battery may further include a cap-down having a hole through which a certain region of the safety vent passes, a sub-plate electrically connected to the cap-down and in direct contact with the certain region of the safety vent, and an insulating plate insulating the cap-down and the sub-plate from the safety vent.

A secondary battery may further include a positive temperature coefficient PTC thermistor interposed between the cap-up and the safety vent.

The shape of the cross-section of ends of the cap-up and the PTC thermistor may be semi-circular or chamfered shape. A welding point may be located in the first region of the cap-up.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
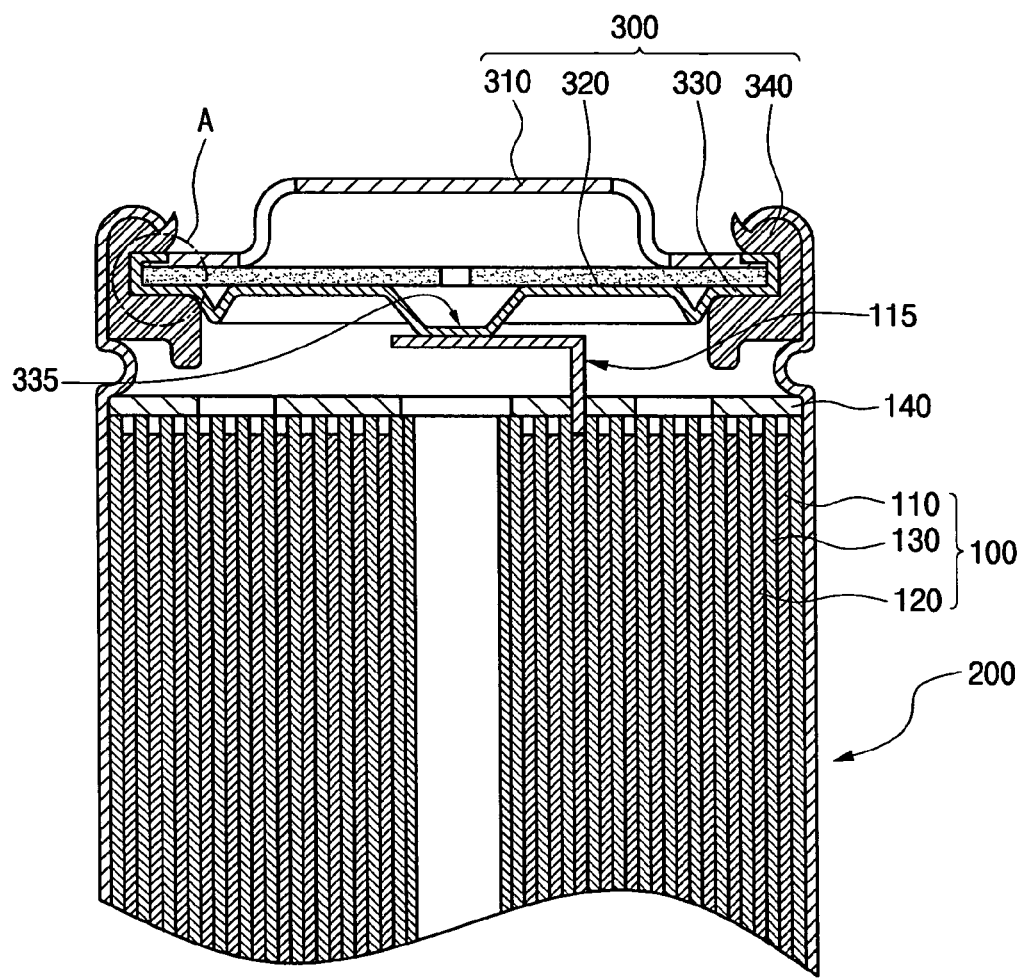
FIG. 1 illustrates a cross-sectional view of a secondary battery according to a first exemplary embodiment.

Korean Patent Application No. 10-2008-0132242, filed on Dec. 23, 2008, in the Korean Intellectual Property Office, and entitled: "Cap Assembly and Secondary Battery Having the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Further, in the drawings, the length and thickness of a layer and a region may be exaggerated for convenience. In addition, like reference numerals refer to the like elements throughout the specification. When a portion is "connected" with another portion, these portions may be "directly connected" or "electrically connected" with each other with a different device therebetween.

First Exemplary Embodiment

Figure 2:
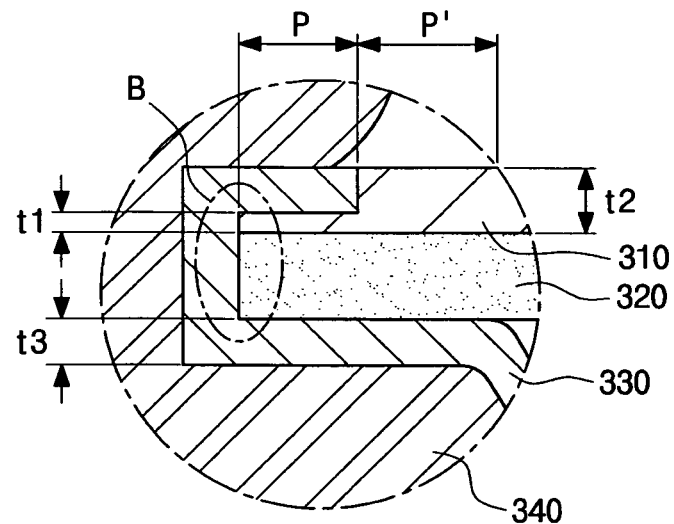
FIG. 2 illustrates an enlarged cross-sectional view of region A of FIG. 1.

FIG. 1 illustrates a cross-sectional view of a secondary battery according to a first exemplary embodiment, and FIG. 2 illustrates an enlarged cross-sectional view of region A of FIG. 1.

Referring to FIGS. 1 and 2, the secondary battery according to the first exemplary embodiment may include an electrode assembly 100, a can 200 housing the electrode assembly 100 and an electrolyte (not shown), and a cap assembly 300 sealing the can 200. The cap assembly may have a safety vent 330 electrically connected to the electrode assembly 100 and a cap-up 310 electrically connected between the safety vent 330 and an external terminal (not shown).

The electrode assembly 100 may include a positive electrode plate 110 having a positive electrode collector (not shown) to which a positive electrode active material (not shown) is applied and a positive electrode tab (not shown) electrically connected to a side of the positive electrode collector. The electrode assembly may further include a negative electrode plate 120 having a negative electrode collector (not shown) to which a negative electrode active material (not shown) is applied and a negative electrode tab (not shown) electrically connected to a side of the negative electrode collector. A separator 130 may be included in the electrode assembly to interpose between the positive electrode plate 110 and the negative electrode plate 120. The electrode assembly 100 may further include an upper insulating plate 140 on an upper surface of the electrode assembly 100 to prevent vertical movement of the electrode assembly 100 and an unnecessary electrical connection between the electrode assembly 100 and the cap assembly 300.

The positive electrode active material may include lithium-containing transition metal oxides or lithium chalcogenide compounds, e.g., $LiCoO_2$, $LiNiO_2$, $LiMnO_2$, $LiMn_2O_4$, and $LiNi_{1-x-y}Co_xM_yO_2$ wherein, $0 \leq x \leq 1$, $0 \leq y \leq 1$, $0 \leq x+y \leq 1$ and M is a metal, e.g., Al, Sr, Mg, or La. The negative electrode active material may include a carbon material, a lithium metal or a lithium alloy, e.g., crystalline carbon, amorphous carbon, a carbon complex, and a carbon fiber.

The positive or negative electrode collector may be formed of at least one or more of stainless steel, nickel, copper, or aluminum. The positive electrode collector may be formed of aluminum or an aluminum alloy, and the negative electrode collector may be formed of copper or a copper alloy.

The separator 130 may be interposed between the positive electrode plate 110 and the negative electrode plate 120 to prevent an electrical short-circuit between the electrode plates 110 and 120, and to allow migration of lithium ions. The separator 130 may be a polyolefin-based polymer layer formed of polyethylene (PE) or polypropylene (PP), or a multilayer thereof.

The can 200 may be formed of a metallic material and has a top opening to house the electrode assembly and the electrolyte. The can 200 may be formed of a metallic material, e.g., aluminum, an aluminum alloy, or stainless steel, which is light and flexible, and electrically connected to one of the positive and negative electrode plates 110 and 120 of the electrode assembly 100 to serve as an electrode terminal.

The electrolyte may allow the lithium ions generated by an electrochemical reaction between the positive and negative electrode plates 110 and 120 to migrate during charge/discharge of the battery. The electrolyte may be a non-aqueous organic electrolyte formed of a compound of a lithium salt and a high-purity organic solvent, or a polymer using a polymer electrolyte.

The cap assembly 300 may include a cap-up 310 that may be coupled to the top opening of the can 200 to seal the can 200 and that may be electrically connected to an external terminal, a safety vent 330 that may be deformed or broken by an inner pressure, and a current interrupt device (CID) 320 on the safety vent 330. The CID may be broken by the safety vent 330 and may interrupt an electrical connection between the electrode assembly 110 and an external terminal. The cap assembly 300 may also include a gasket 340 that may insulate the cap assembly 300 from the can 200 and that may also more stably seal the can 200. The cap assembly 300 may further include a positive temperature coefficient (PTC) thermistor (not shown) disposed in a region where the CID 320 is in contact with the cap-up 310, or in a region where the safety vent 330 is in contact with the CID 320 to prevent overvoltage and overcurrent from being applied to the electrode assembly 100.

When an inner pressure of the secondary battery is higher than a predetermined level as a result of gas being generated from the electrode assembly 100, the safety vent 330 may be deformed or broken to discharge gas, and a portion 335 thereof may project toward the electrode assembly 100. As illustrated in FIG. 1, the portion 335 of the safety vent 330 may project toward the electrode assembly 100 and may be electrically connected to the positive or negative electrode plate 110 or 120 of the electrode assembly 100 via an electrode tab 115, which electrode tab 115 may be electrically connected to the positive or negative tab of the electrode assembly 100.

Referring to FIG. 2, an end of the safety vent 330 may be bent to cover the end of the cap-up 310. Herein, a thickness of the safety vent 330 may be substantially uniform, e.g., including a bent portion. A first region P of the cap-up 310 in contact with the end of the safety vent 330 may have a smaller thickness than a second region P' of the cap-up 310 not in contact with the end of the safety vent 330. Thus, an increase in thickness of the end of the cap assembly 300 due to bending of the safety vent 330 may be minimized. A difference between a first thickness t1, which is a portion of the cap-up 310 not covered by the safety vent 330 of the first region P, and a second thickness t2, which is a thickness of the cap-up 310 of the second region P' may be the same as a thickness t3, which is a thickness of the safety vent 330. The first region P of the cap-up 310 may be welded with the safety vent 330. That is, the first region P of the cap-up 310 has a welding point, and thus, the electrical connection and mechanical strength between the safety vent 330 and the cap-up 310 may be further increased.

In the cap assembly according to a first exemplary embodiment, the end of the safety vent 330 may be bent in the direction of the cap-up 310. When the end of the cap-up 310 and an end of the CID 320 or PTC thermistor interposed between the safety vent 330 and the cap-up 310 have square corners as illustrated in FIG. 2, the bent portion of the safety vent 330 may be damaged by the end of the cap-up 310 and the end of the CID 320 or PTC thermistor. Further, since the end of the safety vent 330 may be difficult to exactly bend along the end of the CID 320 or PTC thermistor, an unnecessary space may be made in the region along the end of the cap-up 310, the end of the CID 320 or PTC thermistor and the bent portion of the safety vent 330 and may result in a degradation of the sealing characteristics of the secondary battery.

By having a cross-section B of ends of a cap-up 310a and a CID 320a or PTC thermistor as chamfered corners (shown in FIG. 3A), or by having a cross-section B of ends of a cap-up 310b and a CID 320b or PTC thermistor as rounded corners (shown in FIG. 3B), degradation of the sealing characteristics of the secondary battery may be prevented.

Second Exemplary Embodiment

Figure 4:
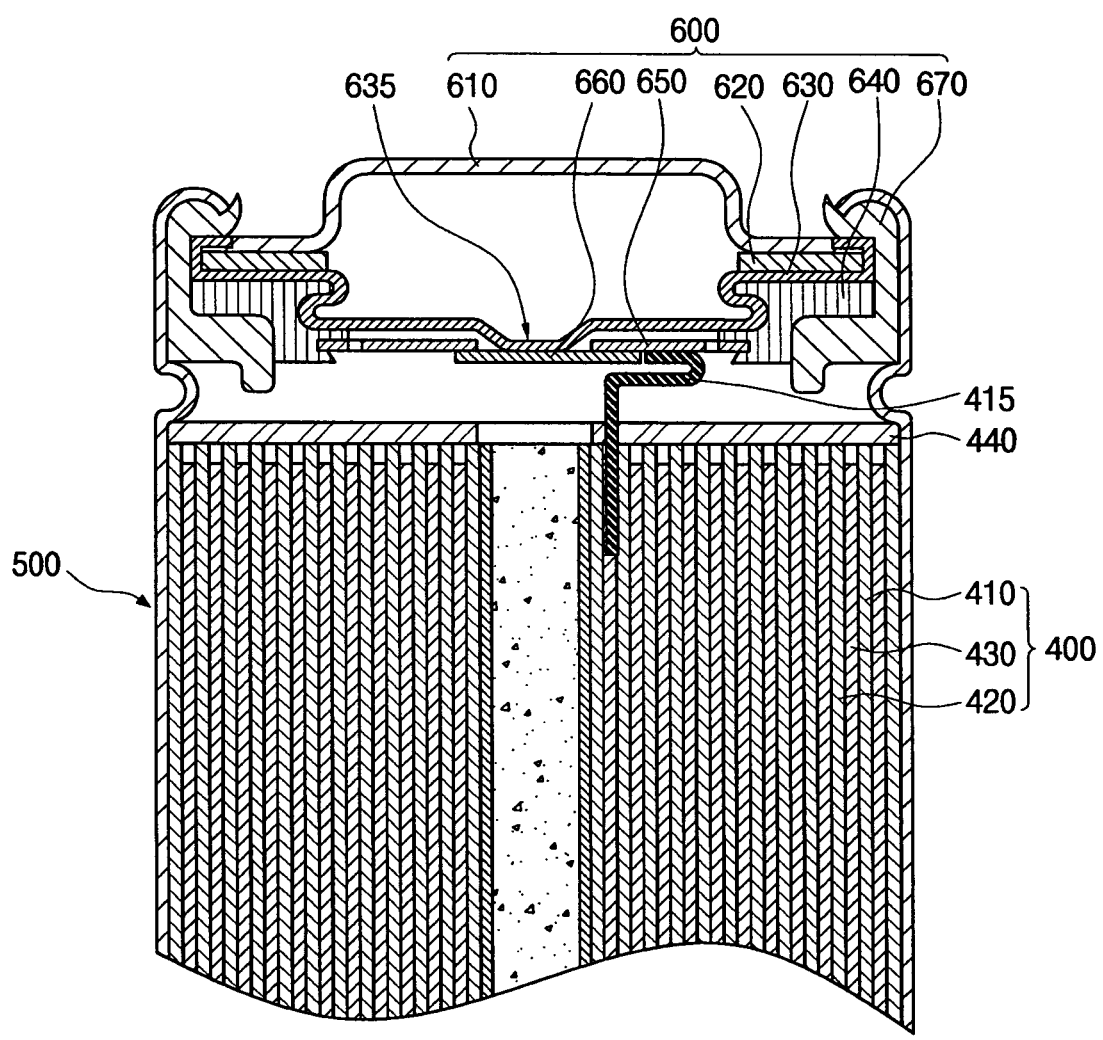
FIG. 4 illustrates a cross-sectional view of a secondary battery according to a second exemplary embodiment.

FIG. 4 illustrates a cross-sectional view of a secondary battery according to a second exemplary embodiment.

Referring to FIG. 4, the secondary battery according to a second exemplary embodiment may include an electrode assembly 400, a can 500 housing the electrode assembly 400 and an electrolyte (not shown), and a cap assembly 600 sealing the can 500. The cap assembly 600 may have a safety vent 630 electrically connected to the electrode assembly 400 and a cap-up 610 electrically connected between the safety vent 630 and an external terminal (not shown).

The electrode assembly 400, a positive electrode plate 410, a negative electrode plate 420, a separator 430, an electrode tab 415, an upper insulating plate 440 and the can 500 of the secondary battery according to the second exemplary embodiment are the same as those of the secondary battery according to the first exemplary embodiment, and thus, detailed descriptions thereof are omitted.

The cap assembly 600 may include a cap-up 610 that may be coupled to a top opening of the can 500 to seal the can 500 as well as electrically connected to an external terminal (not shown), a safety vent 630 that may be bent in the direction of the electrode assembly 400 in a certain region 635 and which may be deformed or broken due to an inner pressure, and a sub-plate 660 interposed between the safety vent 630 and the electrode assembly and, thus, in contact with the certain region 635 of the safety vent 630. The cap assembly 600 may also include a cap-down 650 having a hole through which the certain region 635 of the safety vent 630 in the middle thereof passes and may be electrically connected between the sub-plate 660 and the electrode tab 415, an insulating plate 640 insulating both the cap-down 650 and the sub-plate 660 from the safety vent 630, and a gasket 670 insulating the cap assembly 600 from the can 500 and more stably sealing the can 500. The cap assembly 600 may further include a PTC thermistor 620 disposed in a region where the cap-up 610 may be in contact with the safety vent 630 to prevent application of overvoltage and overcurrent to the electrode assembly 400.

An end of the safety vent 630 may be bent to cover an end of the cap-up 610. Such region of the cap-up 610 that is in contact with the end of the safety vent 630 may be thinner than other region of the cap-up 610 that is not in contact with the end of the safety vent 630. Therefore, an increase in thickness of the end of the cap assembly 600 due to the bent end of the safety vent 630 may be minimized.

Similar to the first exemplary embodiment, the cap-up 610 has a thickness difference between the region in contact with the end of the safety vent 630 and the region not in contact with the end of the safety vent 630. The region of the cap-up 610 that is in contact with the end of the safety vent 630 has a first thickness t1 (shown in FIG. 2), and the region of the cap-up 610 that is not in contact with the end of the safety vent 630 has a second thickness t2 (shown in FIG. 2). The thickness difference may be as much as t3, the thickness of the safety vent 630 (shown in FIG. 2). A welding point may be located in a region where the end of the safety vent 630 is in contact with the cap-up 610.

Figure 3A:
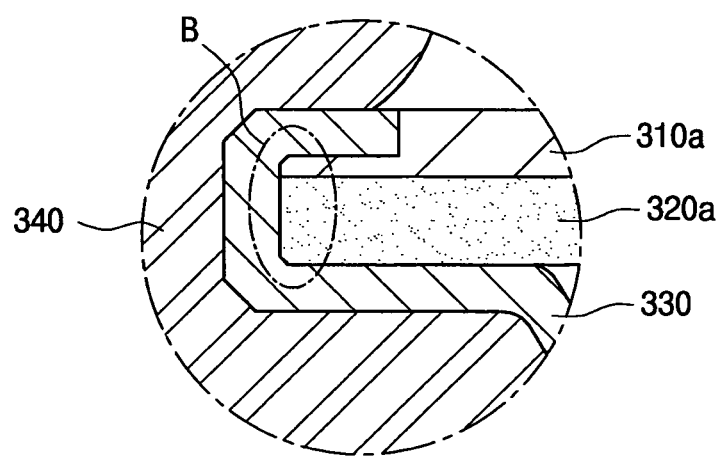
FIGS. 3A and 3B illustrate other enlarged cross-sectional views of region A of FIG. 1 according to a first exemplary embodiment.
Figure 3B:
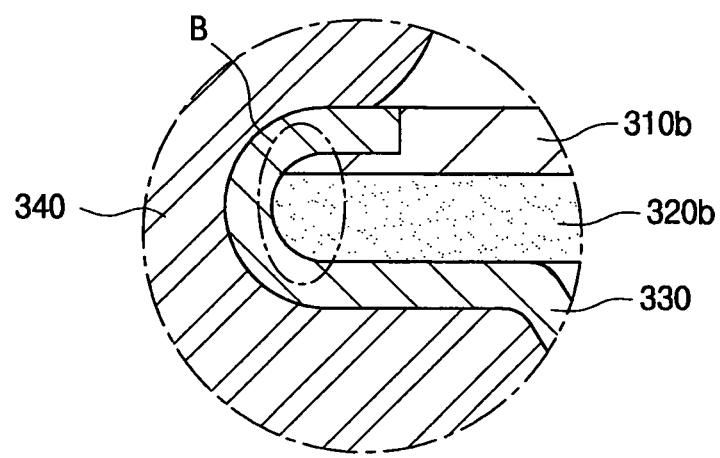

Further, a cross-section of the end of the cap-up 610 and an end of the PTC thermistor disposed between the cap-up 610 and the safety vent 630 may have a chamfered corner, which is similar to that illustrated in FIG. 3A, or a rounded corner, which is similar to that illustrated in FIG. 3B.

In the cap assembly and the secondary battery having the same according to the exemplary embodiments, the end of the safety vent may be bent to cover the end of the cap-up. The cap-up has a smaller thickness in a region where a contact with the end of the safety vent is made than a region not in contact with the end of the safety vent. Thus, electrical connection and mechanical strength between the safety vent and the cap-up may be improved without increasing the thickness of the end of the cap assembly.

In addition, the ends of the cap-up and the CID or PTC thermistor interposed between the cap-up and the safety vent may have at least four polygonal, e.g., chamfered shape or semi-circular cross-sections, which can prevent an unnecessary space from being generating in between the bent portion at the end of the safety vent and the ends of the cap-up and the CID or PTC thermistor.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A cap assembly comprising
a cap up including a first region and a second region, the first region being located outside the second region; and
a safety vent disposed on the cap up, an end of the safety vent being bent to cover the first region of the cap up, the first region being defined as an entire area of the cap up covered by the end of the safety vent and the second region being defined as an area of the cap up adjacent to the first region and not covered by the end of the safety vent,
wherein a maximum thickness of the first region is smaller than a maximum thickness of the second region.

2. The cap assembly as claimed in claim 1, wherein the maximum thickness of the second region is the sum of the maximum thickness of the first region and a thickness of the safety vent.

3. The cap assembly as claimed in claim 1, further comprising:
a current interrupt device disposed between the cap-up and the safety vent.

4. The cap assembly as claimed in claim 3, wherein a shape of a cross-section of ends of the cap-up and the current interrupt device is a semi-circular or a chamfered shape.

5. The cap assembly as claimed in claim 1, further comprising:
a cap-down having a hole through which a certain region of the safety vent passes in the middle,
a sub-plate electrically connected to the cap-down and in direct contact with the certain region of the safety vent, and
an insulating plate insulating the cap-down and the sub-plate from the safety vent.

6. The cap assembly as claimed in claim 1, further comprising:
a positive temperature coefficient (PTC) thermistor interposed between the cap-up and the safety vent.

7. The cap assembly as claimed in claim 6, wherein a shape of a cross-section of ends of the cap-up and the PTC thermistor is a semi-circular or a chamfered shape.

8. The cap assembly as claimed in claim 1, wherein a welding point is located in the first region of the cap-up.

9. A secondary battery, comprising:
an electrode assembly including a positive electrode plate, a negative electrode plate, and a separator disposed between the electrode plates;
a can configured to house the electrode assembly; and
a cap assembly configured to seal the can,
wherein the cap assembly includes a cap up having a central region and a peripheral region, and a safety vent having an end that is bent toward the cap up,
wherein the peripheral region is located outside the central region,
wherein the peripheral region is defined as an entire area of the cap up disposed in the bent end of the safety vent and the central region is defined as an area of the cap up adjacent to the peripheral region and not disposed in the bent end of the safety vent, and
wherein a maximum thickness of the peripheral region is thinner than a maximum thickness of the central region.

10. The secondary battery as claimed in claim 9, wherein a thickness of the safety vent is the same as a difference between the maximum thickness of central region and the maximum thickness of peripheral region.

11. The secondary battery as claimed in claim 9, further comprising:
a current interrupt device disposed between the cap-up and the safety vent.

12. The secondary battery as claimed in claim 11, wherein a shape of a cross-section of ends of the cap-up and the current interrupt device is a semi-circular or a chamfered shape.

13. The secondary battery as claimed in claim 9, further comprising:
a cap-down having a hole through which a certain region of the safety vent passes in the middle,
a sub-plate electrically connected to the cap-down and in direct contact with the certain region of the safety vent, and
an insulating plate insulating the cap-down and the sub-plate from the safety vent.

14. The secondary battery as claimed in claim 9, further comprising:
a positive temperature coefficient (PTC) thermistor interposed between the cap-up and the safety vent.

15. The secondary battery as claimed in claim 14, wherein a shape of a cross-section of ends of the cap-up and the PTC thermistor is semi-circular or chamfered shape.

16. The secondary battery as claimed in claim 9, wherein a welding point is located in the peripheral region of the cap-up.

* * * * *